United States Patent
Mast et al.

(10) Patent No.: US 11,511,883 B2
(45) Date of Patent: Nov. 29, 2022

(54) SYSTEMS AND METHODS FOR AIRPORT SELECTION AND DISPLAY OF RANGE REMAINING DURING ENGINE OUT CONDITIONS

(71) Applicant: HONEYWELL INTERNATIONAL INC., Charlotte, NC (US)

(72) Inventors: Michael Mast, Sun City, AZ (US); Yuta Morioka, Tempe, AZ (US); Martin Jezek, Brno (CZ); Jeffrey Glenn, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 40 days.

(21) Appl. No.: 17/179,957

(22) Filed: Feb. 19, 2021

(65) Prior Publication Data

US 2021/0276728 A1 Sep. 9, 2021

Related U.S. Application Data

(60) Provisional application No. 62/986,336, filed on Mar. 6, 2020.

(51) Int. Cl.
| | |
|---|---|
| *B64D 45/00* | (2006.01) |
| *B64D 43/02* | (2006.01) |
| *B64D 45/08* | (2006.01) |
| *G05D 1/10* | (2006.01) |
| *G08G 5/00* | (2006.01) |
| *G08G 5/02* | (2006.01) |

(52) U.S. Cl.
CPC ............. *B64D 45/00* (2013.01); *B64D 43/02* (2013.01); *B64D 45/08* (2013.01); *G05D 1/105* (2013.01); *G08G 5/0047* (2013.01); *G08G 5/025* (2013.01); *B64D 2045/0085* (2013.01)

(58) Field of Classification Search
CPC ........ B64D 45/00; B64D 43/02; B64D 45/08; B64D 2045/0085; G05D 1/105; G08G 5/0047; G08G 5/025
See application file for complete search history.

(56) References Cited

U.S. PATENT DOCUMENTS

| | | | |
|---|---|---|---|
| 9,274,529 B2 * | 3/2016 | Ben-Shachar ....... | G05D 1/0072 |
| 9,310,222 B1 | 4/2016 | Suiter et al. | |
| 10,037,704 B1 * | 7/2018 | Myr ..................... | G08G 5/0026 |
| 2017/0249852 A1 * | 8/2017 | Haskins ............... | G08G 5/0086 |
| 2019/0041233 A1 * | 2/2019 | Duerksen ............. | G08G 5/0034 |
| 2019/0378422 A1 * | 12/2019 | Rankin ..................... | G07C 5/06 |
| 2020/0340827 A1 * | 10/2020 | Gepner ................. | G01C 23/005 |
| 2021/0088356 A1 * | 3/2021 | Glomski ................ | G08G 5/025 |
| 2021/0276728 A1 * | 9/2021 | Mast ...................... | B64D 45/00 |

* cited by examiner

*Primary Examiner* — Hussein Elchanti
(74) *Attorney, Agent, or Firm* — Lorenz & Kopf, LLP

(57) ABSTRACT

Flight guidance systems and methods that provide an airport selection in response to an EO condition in a single engine plane. The airport selection takes into consideration factors such as optimal approach type, runway length, weather, terrain, remaining battery time, and the like. Additionally, various also generate and display a visual indication of a remaining glide range when the EO condition is happening; the remaining glide range determination is based, at least in part, on terrain.

20 Claims, 15 Drawing Sheets

FMS Scan along Various Radials
(Scan will occur full 360 degrees around the aircraft)

- Lateral Path for a Radial

- Overlay of Terrain and Glide Profile Matrices

SYSTEMS AND METHODS FOR AIRPORT SELECTION AND DISPLAY OF RANGE REMAINING DURING ENGINE OUT CONDITIONS

CROSS REFERENCE TO RELATED DOCUMENTS

This application claims priority to Provisional Patent Application No. 62/986,336, filed Mar. 6, 2020, the entire content of which is incorporated by reference herein.

TECHNICAL FIELD

The following disclosure relates generally to flight guidance and, more particularly, to flight guidance systems and methods for airport selection and display of glide range remaining during engine out conditions.

BACKGROUND

An engine out (EO) condition in a single engine aircraft presents a pilot with objective technical problems, such as determining an airport at which to land, and minimizing a loss in altitude resulting in not being able to get to an intended airport. To ensure a safe landing responsive to an EO condition, the pilot has to make an optimized airport selection for the EO condition and determine optimal navigation for the EO condition and selected airport in a very brief amount of time, which is cognitively demanding.

Some available solutions provide a nearest airport function within the Flight Management System (FMS 40), but this function generally does not take into consideration factors such as optimal approach type, runway length, weather, terrain, remaining battery time, and the like. Additionally, regardless of how an airport is selected in response to an EO condition, available solutions generally do not provide adequate visual indication of range during the EO condition.

Accordingly, improved methods, systems, and aircraft systems for airport selection and display of glide range remaining during engine out (EO) conditions are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a flight guidance system for airport selection during engine out (EO) conditions in an aircraft, the system comprising: a source of an engine status; a source of aircraft status data for the aircraft; and a controller architecture operationally coupled to the source of the engine status and the source of aircraft status data, and configured to: determine, continuously, a current location and trajectory of the aircraft by processing the aircraft status data; responsive to determining that an EO condition is indicated by the engine status, generating a notification of the EO condition; determine when an enable is valid for EO guidance; receive an activate EO guidance command; and begin an EO guidance mode responsive to receiving the activate EO guidance command when the enable is valid; and while in the EO guidance mode, perform EO guidance operations including: computing an optimal EO destination airport and corresponding path to it from the current location; presenting the optimal EO destination airport and the corresponding path for a pilot to review; receiving a pilot selection of the optimal EO destination airport subsequent to presenting the optimal EO destination airport; constructing a lateral and a vertical glide path to the optimal EO destination airport; and creating and presenting a plurality of glide profiles for each of a plurality of radials extending from the current location, each glide profile having a range that indicates an aircraft specific performance in wind and loss of potential energy due to lateral maneuvers.

Also provided is a method for flight guidance for airport selection during engine out (EO) conditions in an aircraft, the method comprising: at a controller architecture programmed by programming instructions, processing received aircraft status data to determine, continuously, a current location and trajectory of the aircraft; processing received engine status to determine whether an EO condition is indicated; responsive to determining that an EO condition is indicated, generating a notification of the EO condition; determining when an enable is valid for EO guidance; receiving an activate EO guidance command; and beginning an EO guidance mode responsive to receiving the activate EO guidance command when the enable is valid; and while in the EO guidance mode, performing EO guidance operations including: computing an optimal EO destination airport and corresponding path to it from the current location; presenting the optimal EO destination airport and the corresponding path for a pilot to review; receiving a pilot selection of the optimal EO destination airport subsequent to presenting the optimal EO destination airport; constructing a lateral and a vertical glide path to the optimal EO destination airport; tuning a multi-mode digital radio (MMDR) to an appropriate frequency if the pilot selection includes an Instrument Landing System (ILS) approach; and creating a plurality of glide profiles for each of a plurality of radials extending from the current location, each glide profile having a range that indicates an aircraft specific performance in wind and loss of potential energy due to lateral maneuvers.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described flight guidance system.

Overview

Flight guidance systems and methods, which provide an airport selection in response to an EO condition in a single engine plane, are provided. Specifically, the airport selection provided is an improvement over simply identifying a nearest airport, in that it also takes into consideration factors such as optimal approach type, runway length, weather, terrain, remaining battery time, and the like.

Additionally, various embodiments of the provided flight guidance system also generate and display a visual indication of a remaining glide range when the EO condition is happening, the remaining glide range determination is based, at least in part, on terrain. Together, these features provide a pilot with an objectively improved human machine interface and flight guidance experience.

In the above-described manner, the flight guidance system provides a heightened intelligence to guidance during an EO condition for a single engine plane. Generally, this heightened intelligence will remain transparent to the pilot as few, if any additional pilot interactions will be required by the flight guidance system under typical circumstances. An overarching description of an exemplary flight guidance system suitable for performing such processes will now be described in conjunction with FIG. 1.

Figure 1:
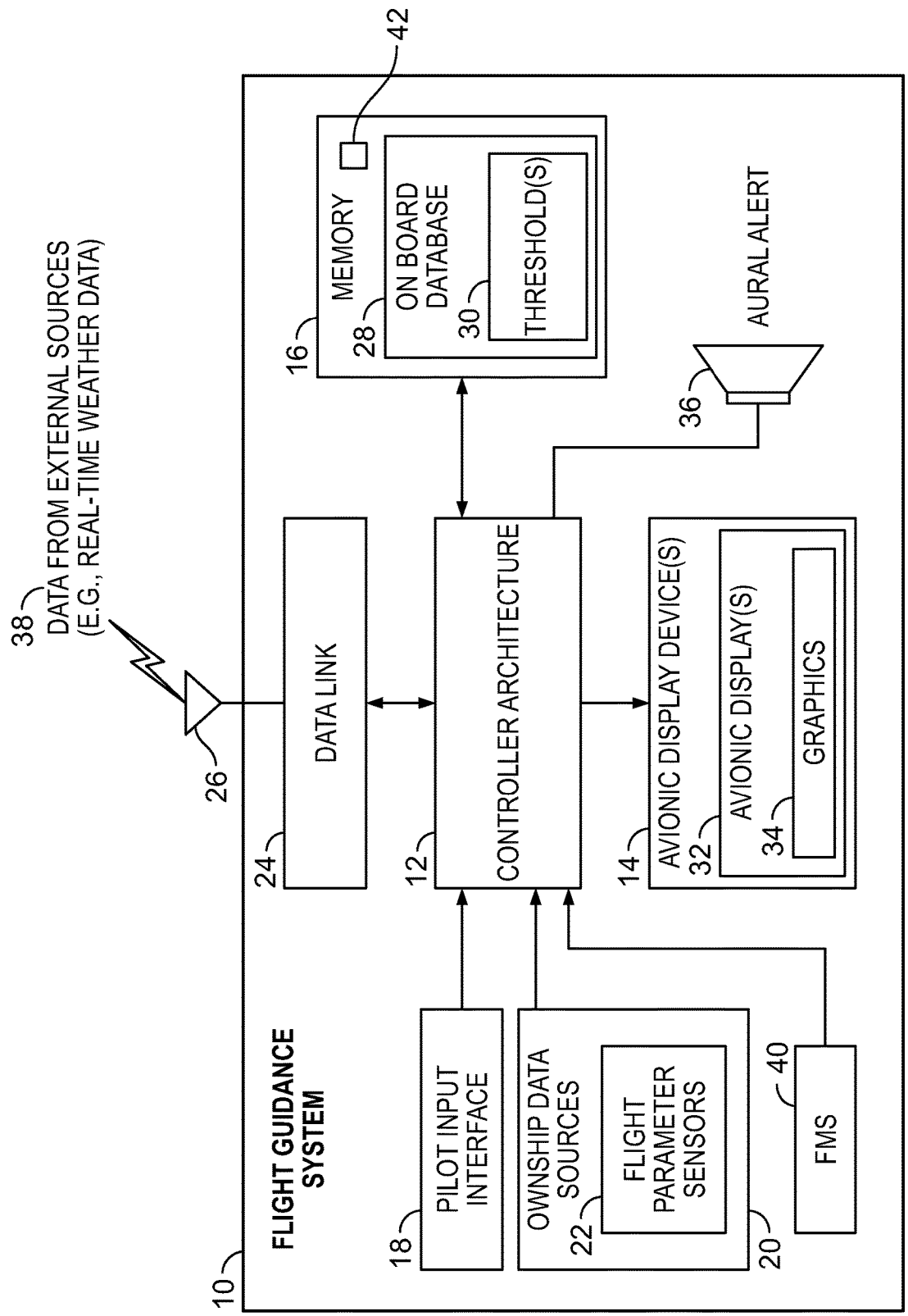
FIG. 1 is a block diagram of a flight guidance system, which supports improved airport selection and visual range indication during engine out conditions, as illustrated in accordance with an exemplary embodiment of the present disclosure.

Example of System for Airport Selection and Visual Range Indication During Engine Out Conditions FIG. 1 is a block diagram of a flight guidance system 10, as illustrated in accordance with an exemplary and non-limiting embodiment of the present disclosure. Flight guidance system 10 may assist in the selection of an airport and in the generation and rendering of visual range indication for an ownship aircraft (A/C); e.g., flight guidance system 10 may be utilized to select an airport and generate and render a visual range indication for a non-illustrated A/C, which carries or is equipped with system 10. As schematically depicted in FIG. 1, flight guidance system 10 includes the following components or subsystems, each of which may assume the form of a single device or multiple interconnected devices: a controller architecture 12, at least one avionic display device 14, computer-readable storage media or memory 16, and a pilot input interface 18. Flight guidance system 10 may further contain ownship data sources 20, which provides various avionics system status data, including being a source of an engine status, which can indicate a detected engine out (EO) condition when it occurs. Ownship data sources 20 may also include, for example, an array of flight parameter sensors 22, and a flight management system (FMS) 40. In various embodiments, the flight guidance system 10 may also contain a datalink subsystem 24 including an antenna 26, which may wirelessly transmit data to and receive data from various sources external to system 10, such as a cloud-based forecasting service of the type discussed below.

Although schematically illustrated in FIG. 1 as a single unit, the individual elements and components of flight guidance system 10 can be implemented in a distributed manner utilizing any practical number of physically-distinct and operatively-interconnected pieces of hardware or equipment. When system 10 is utilized to construct supersonic flight plans for a manned A/C, the various components of flight guidance system 10 will typically all be located onboard the A/C.

The term "controller architecture," as appearing herein, broadly encompasses those components utilized to carry-out or otherwise support the processing functionalities of flight guidance system 10. Accordingly, controller architecture 12 can encompass or may be associated with any number of individual processors, flight control computers, navigational equipment pieces, computer-readable memories (including or in addition to memory 16), power supplies, storage devices, interface cards, and other standardized components. In various embodiments, controller architecture 12 is embodied as an enhanced computer system that includes or cooperates with at least one firmware and software program 42 (generally, computer-readable instructions that embody an algorithm) for carrying-out the various process tasks, calculations, and control/display functions described herein. During operation, the controller architecture 12 may be pre-programmed with, or load and then execute the at least one firmware or software program 42 to thereby perform the various process steps, tasks, calculations, and control/display functions described herein.

Controller architecture 12 may utilize the datalink 24 to exchange data 38 with one or more external sources to support operation of flight guidance system 10 in embodiments. In various embodiments, the datalink 24 functionality is integrated within the controller architecture 12. In various embodiments, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 can encompass any number and type of storage media suitable for storing computer-readable code or instructions, such as the aforementioned software program, as well as other data generally supporting the operation of flight guidance system 10. In certain embodiments, memory 16 may contain one or more databases 28, such as geographical (terrain), runway, navigational, and historical weather databases, which may be updated on a periodic or iterative basis to ensure data timeliness. The databases maintained in memory 16 may be shared by other systems onboard the A/C carrying flight guidance system 10, such as an Enhanced Ground Proximity Warning System (EGPWS) or a Runway Awareness and Advisory System (RAAS). Memory 16 may also store the software program 42 and/or one or more threshold values, as generically represented by box 30. In various embodiments, the controller architecture 12 has integrated therein suitable memory for processing calculations and for storing the software program 42 and/or the thresholds 30.

Flight parameter sensors 22 supply various types of data or measurements to controller architecture 12 during A/C flight. In various embodiments, flight parameter sensors 22 provide data and measurements from a Full Authority Digital Engine Control (FADEC), such data or measurements may include engine status (e.g., an engine-out (EO) condition signal) and fuel flow to the engine. In A/C not having a FADEC, engine status and fuel flow may be determined based on monitored generator current in the engine.

In various embodiments, the flight parameter sensors 22 also supply aircraft status data for the aircraft, including, without limitation: airspeed data, groundspeed data, altitude data, attitude data including pitch data and roll measurements, heading information, flight track data, inertial reference system measurements, Flight Path Angle (FPA) measurements, and yaw data. In various embodiments, status data for the aircraft also includes one or more of: flight path data, data related to A/C weight, time/date information, remaining battery time, data related to atmospheric conditions, radar altitude data, geometric altitude data, wind speed and direction data. Further, in certain embodiments of system 10, controller architecture 12 and the other components of flight guidance system 10 may be integrated within or cooperate with any number and type of systems commonly deployed onboard A/C including, for example, an FMS 40, an Attitude Heading Reference System (AHRS), an Instrument Landing System (ILS), and/or an Inertial Reference System (IRS), to list but a few examples.

With continued reference to FIG. 1, avionic display device 14 (or devices 14) can include any number and type of image generating devices on which one or more avionic displays may be produced. When flight guidance system 10 is utilized to construct flight plans for a manned A/C, display device 14 may be affixed to the static structure of the A/C cockpit as, for example, a Head Down Display (HDD) or Head Up Display (HUD) unit. Alternatively, display device 14 may assume the form of a movable display device (e.g., a pilot-worn display device) or a portable display device, such as an Electronic Flight Bag (EFB), a laptop, or a tablet computer carried into the A/C cockpit by a pilot.

At least one avionic display 32 is generated on display device 14 during operation of flight guidance system 10; the term "avionic display" defined as synonymous with the term "aircraft-related display" and encompassing displays generated in textual, graphical, cartographical, and other formats. Avionic display 32 is generated to include various visual elements or graphics 34, which may be referenced by a pilot during the EO condition. Graphics 34 can include, for example, textual readouts relating to airport selection criteria or text annunciations indicating whether flight guidance system 10 is able to select an airport satisfying such airport selection criteria. The avionic display or displays 32 generated by flight guidance system 10 can include alphanumerical input displays of the type commonly presented on the screens of MCDUs, as well as Control Display Units (CDUs) generally. The graphics 34 on the avionic display or displays 32 can include a visual EO range indicator, such as an EO remaining-range ring that extends around the A/C. The avionic display or displays 32 generated by flight guidance system 10 can also generate various other types of displays on which symbology, text annunciations, and other graphics pertaining to flight planning. Embodiments of flight guidance system 10 can generate graphics 34 on one or more two dimensional (2D) avionic displays, such a horizontal or vertical navigation display; and/or on one or more three dimensional (3D) avionic displays, such as a Primary Flight Display (PFD) or an exocentric 3D avionic display.

An audio system 36 is configured to, responsive to commands from the controller architecture 12, emit aural alerts which includes alert tones and beeps, as well as speech, such as "Warning—an engine out condition has been detected."

An exemplary method, which is suitably implemented by flight guidance system 10 in performing processing tasks related to boom-regulated flight planning, will now be described in conjunction with FIGS. 2-3.

Examples of Methods for Airport Selection During EO Conditions

Figure 2:
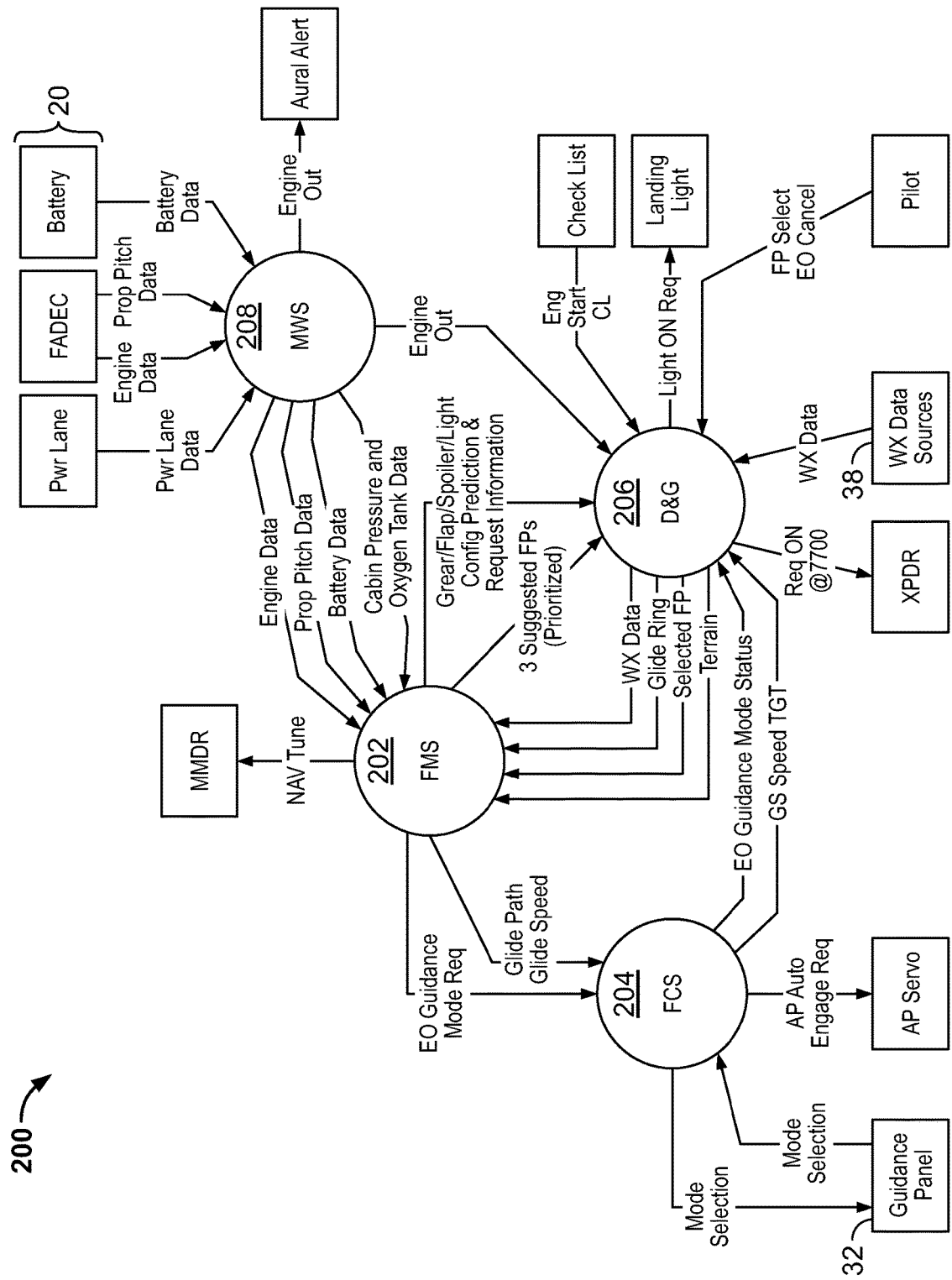
FIG. 2 is a process diagram setting-forth an exemplary partition of process steps that can be carried-out by the flight guidance system of FIG. 1, for airport selection and range visualization during an EO condition, as illustrated in accordance with an exemplary embodiment of the present disclosure.

FIG. 2 is an exemplary process diagram 200 for the flight guidance system 10 (FIG. 1) for airport selection and display of remaining glide range during an EO condition. In various embodiments, process steps based on the process diagram 200 are embodied in an algorithm encoded into a software program and executed as computer-implemented functions or process steps, such as, by the controller architecture 12. In some embodiments, the process steps are aggregated into larger process blocks, and the controller architecture 12 directs or delegates the aggregated larger process blocks to various systems on-board the A/C to perform. In an embodiment depicted in FIG. 2, the process blocks are aggregated into four large process blocks: A Flight Management System (FMS) process 202 block, a Flight Control System (FCS) process 204 block, a Monitor Warning System (MWS) process 208 block, and a display and graphics (D&G) process 206 block. Each process block may entail a single process or multiple sub-processes. In some embodiments, a software module or a hardware module may perform the process steps of a process block (e.g., there may be a corresponding FMS module, FCS module, MWS module and D&G module). The arrangement of process blocks/modules shown in FIG. 2 and described below are provided by way of non-limiting example only.

Figure 3:
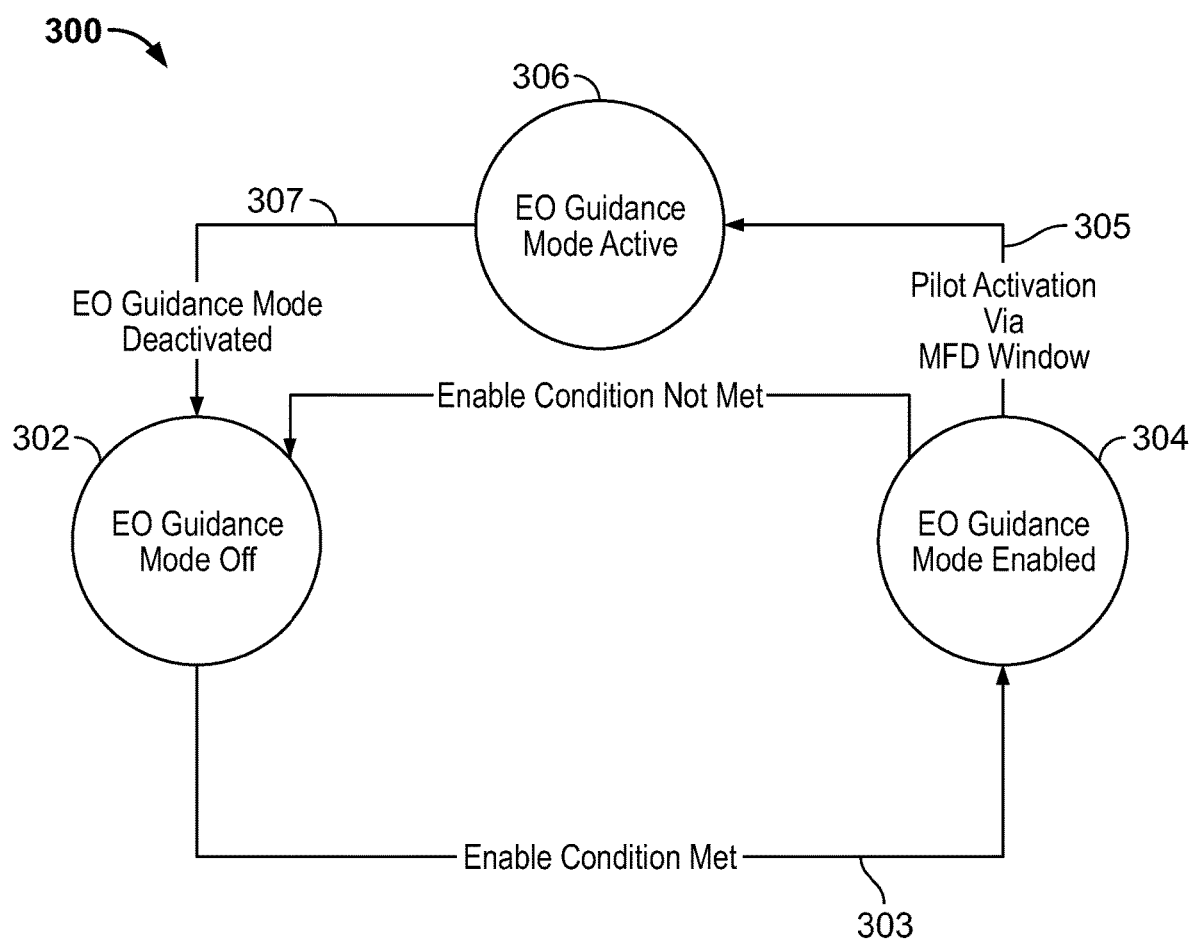
FIG. 3 depicts an EO guidance mode state machine that may be implemented in the process steps of FIG. 2, as illustrated in accordance with an exemplary embodiment of the present disclosure.

FIG. 3 depicts an EO guidance mode state machine 300 with steps that may be implemented in a method for flight guidance. At 302, EO guidance mode is initially off; 302 may also be referred to as a deactivation state. In various embodiments, EO guidance mode is enabled (enable valid 303) by, and for the duration of, a concurrence of: (i) the A/C is at or above a minimum height above ground and (ii) all input criterion for FMS process 202 to provide EO guidance are valid. Input criteria are described in more detail below. When the controller architecture 12 determines that an enable is valid 303 condition has occurred, the system 10 enables EO guidance mode at 304. At 304, for so long as the enable is valid 303 condition continues occurring, as determined by the controller architecture 12, the system 10 continues to operate in EO Guidance Mode at 304. At 304, responsive to determining that the enable is valid 303 condition has ceased occurring, the state returns to EO guidance mode off, or deactivation, at 302.

From 304, the controller architecture 12 is responsive to receiving an activate EO guidance command 305 from a pilot or user when the enable is valid; and, upon receiving the activate EO guidance command 305, the state changes to EO guidance mode active at 306. Said differently, the system 10 begins EO guidance mode responsive to receiving an activate EO guidance command when the enable is valid. While in EO guidance mode active at 306, the controller architecture 12 performs EO guidance mode operations until it receives a deactivate input 307, that deactivates the EO guidance mode. Responsive to the deactivate input, the state moves from 306 back to EO guidance mode off at 302.

When EO guidance mode is enabled at 304, the FMS 40 starts computing, and continually updates, based on an aircraft current location, at least one optimal EO destination airport and the corresponding path to get there. When the engine status indicates an EO condition, the system 10 detects that EO indication and performs actions based thereon. At 304, responsive to detecting an EO condition, the system 10 may generate a notification for a pilot of the detected EO condition in one or more of the following ways: with alphanumeric messages, a visually distinguishable graphic, and/or lateral or horizontal views presented on an aviation display 32. At 304, responsive to detecting an EO condition, the system 10 may reference the already computed at least one optimal EO destination airport and the corresponding path to get there, and present to the pilot (e.g., on the avionic displays 32) an optimal airport and corresponding path for landing the aircraft. In an embodiment, responsive to detecting the EO condition while in state 304, the system 10 may generate a notification for the pilot of the detected EO condition with an aural alert, a visual alert, or both an aural alert and a visual alert.

Figure 4:
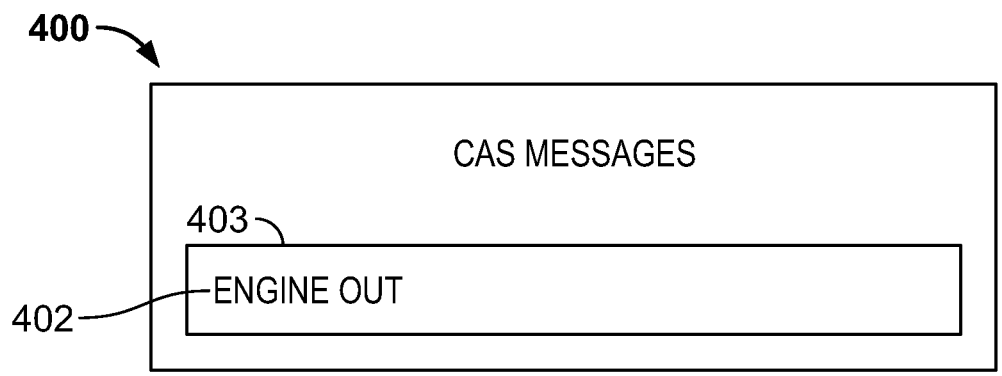
FIGS. 4-5 depict exemplary CAS messages alerting a pilot to an EO condition, in accordance with an exemplary embodiment of the present disclosure.
Figure 5:
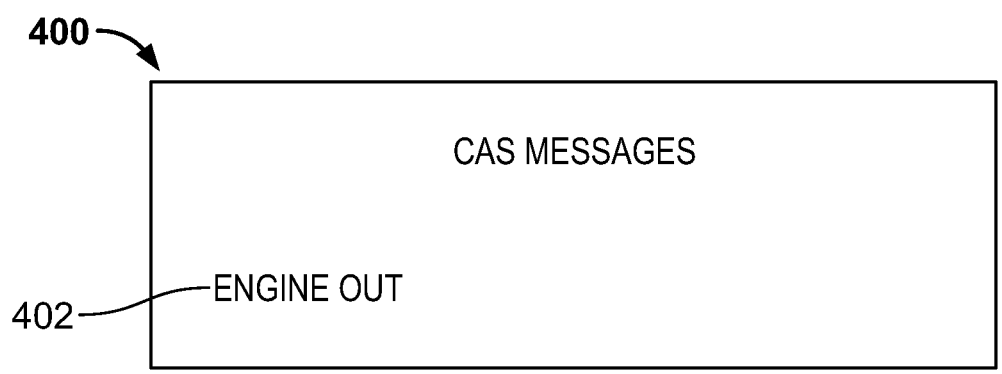

In an example shown in FIG. 4 and FIG. 5, the visual alert may be incorporated into a Crew Alerting System (CAS) message 400. In FIG. 4, a visually distinguishable graphic 403 is rendered with an alphanumeric message "Engine Out" 402 therein. In the example, the visually distinguishable graphic 403 is a rectangle, but other shapes and visually distinguishing methodologies may be employed to highlight the alphanumeric message "Engine Out" 402.

Subsequent to being notified of the EO condition and viewing the optimal airport and corresponding path, the pilot may activate the EO guidance mode (providing an activate command 305 to the controller architecture 12, via the pilot input interface 18).

In various embodiments, when the system 10 receives an activate command 305 (at 304) (subsequent to the presentation of the optimal airport and corresponding path) the activate command effectively selects the airport and corresponding path that are presented. Responsive to the selection, the state moves to 306, and the controller architecture 12 begins providing the EO guidance accordingly. Said differently, at 306, the system 10 starts guiding the aircraft to the selected airport (i.e., performing the EO guidance responsive to the activate command 305).

When the pilot activates the EO guidance mode, using the pilot input interface 18, the system 10 may render the EO guidance mode active state 306 as shown in FIG. 5, wherein the visually distinguishing graphic 403 is removed from the CAS message display 400.

In various embodiments, the optimal EO destination airport and corresponding path to it from the current location is one of a number of most optimal EO destination airports with respective paths, and the number of most optimal EO destination airports are selected because they are within a distance threshold from the aircraft. The distance threshold may be implemented as that of the Glide Ring during normal operations. In these embodiments, the controller architecture 12 may employ a distance threshold equal to the Glide Ring and locate the number of most optimal EO destination airports within the Glide Ring during normal operations. In these embodiments, the number is usually a preprogrammed number, and less than or equal to three (3), and "the preprogrammed number of most optimal EO destination airports within the Glide Ring during normal operations" is shortened to "the number of optimal EO airports." The controller architecture 12 may employ a priority protocol which allows the pilot to assign priority to each of the optimal EO airports in the number of optimal airports. Responsive to this, the system 10 may command the FMS 40 to continuously update the information for each of the number of optimal EO airports corresponding to their assigned priority if EO Guidance Mode 304 is enabled. This priority protocol advantageously allows the system 10 to present an EO flight plan for each of the number of optimal EO airports with minimum delay, responsive to a selection by the pilot. For each of the number of optimal EO airports, FMS 40 may reference any published approach to determine the optimal runway and approach. The controller architecture 12 may also reference, from onboard databases 28, published transition and approach data in the generation of range remaining graphics (e.g., a glide ring) to minimize the risk of flying into obstacles near the runway.

The controller architecture 12 determines the number of optimal EO airports and generates range remaining graphics (e.g., a glide ring), including, for each of the number of optimal EO airports, an associated transition, approach type, and runway, based on a weighted sum of at least some of the following valid input criteria:

Airport runway length

Time to the airport, considering remaining battery time

Steepness of geometric glide path to the airport—Steepness criteria is intended to favor an airport that would result in less steep glide path if everything else being the same.

Published approach type

En route significant weather

Destination airport information such as:

1. runway closure from NOTAM
2. airport weather from METAR

Airport category—airport category is intended to favor less busy airport if everything else being the same.

With a focus on the process steps associated with the FMS process 202, the controller architecture 12 may command the FMS 40 to automatically tune a multi-mode digital radio (MMDR) to an appropriate frequency if the selected approach is an Instrument Landing System (ILS) approach.

The controller architecture 12 may command the FMS 40 to ensure that lateral and vertical glide paths can be constructed to each of the optimal EO destination airports. To support this functionality, the algorithm in the software program may work iteratively with predictions of the lateral and vertical functions of the FMS 40.

The controller architecture 12 may command the FMS 40 to incorporate en route significant weather (WX) data, i.e. WX radar data and severe weather data from Instrument Navigation (INAV) display, into the algorithm that determines members of the number of optimal EO airports. The controller architecture 12 may command the FMS 40 to investigate alternative methods to obtain en route WX data into the algorithm, such as requests thru VHF/SATCOM data. The controller architecture 12 may take latencies of the data from these sources into account.

The controller architecture 12 may command the FMS 40 to incorporate airport surface weather (WX) data from display, i.e. METAR from XMWX, into the algorithm. FMS 40 may use alternative methods to incorporate METAR data into the algorithm that determines members of the number of optimal EO airports, such as FIS-B or requests over VHF/SATCOM datalink.

The controller architecture 12 will be capable of determining each optimal EO destination airport regardless of the availability of en route and airport surface WX data. In various embodiments, the FMS process 202 and D&G process 206 will provide an aural alert of the EO condition and a visual indication to pilot of the number of optimal EO airports and an indication of one of the number of optimal EO airports that was selected by a pilot.

Figure 6:
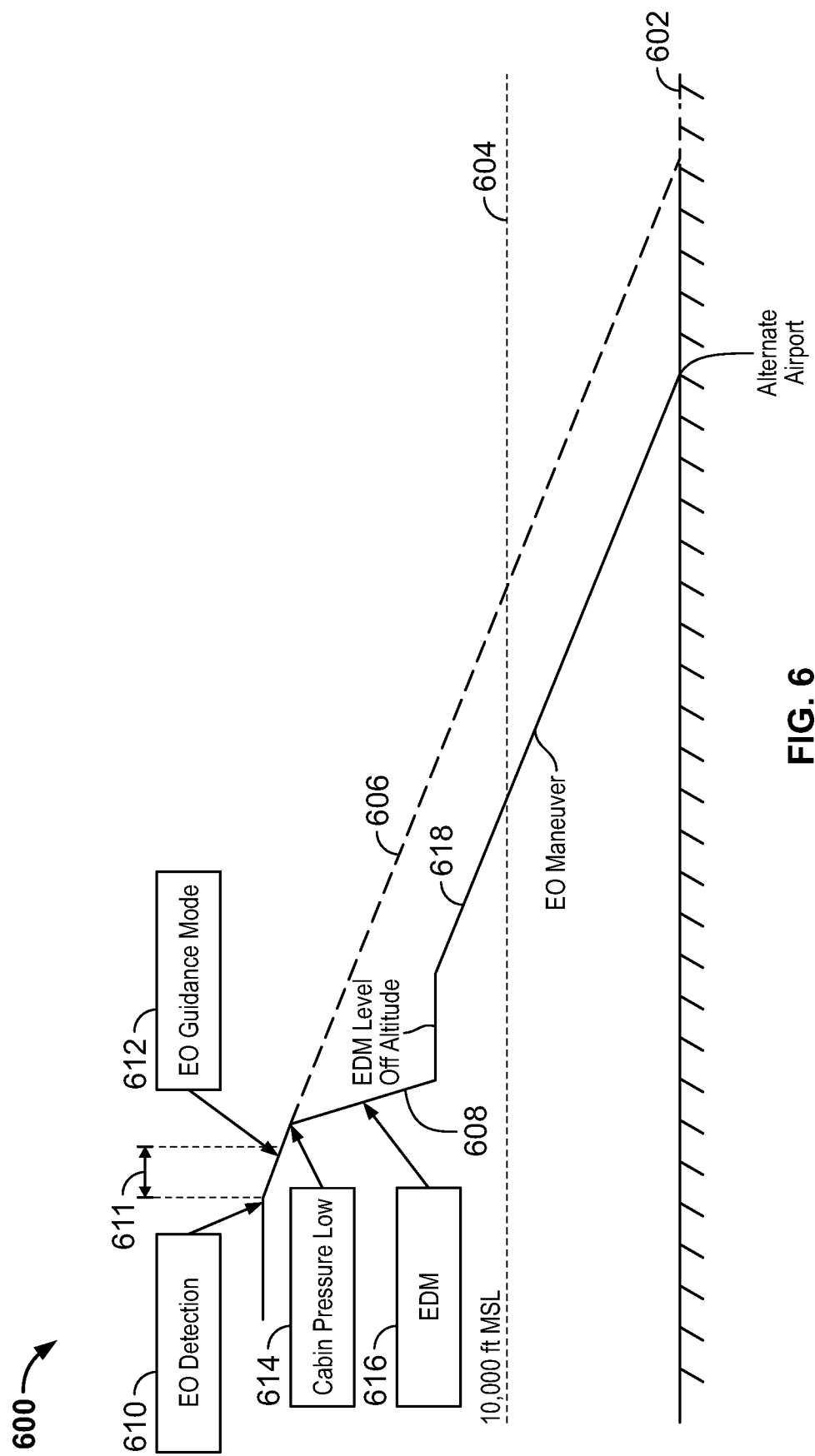
FIG. 6 depicts an exemplary application for the flight guidance system, in accordance with an exemplary embodiment of the present disclosure.

Turning now to FIG. 6, construction of the vertical and lateral glide path is described. The controller architecture 12 will continuously update the lateral and vertical glide paths as well as current glide speed to the number of optimal EO airports using existing and/or unique glide path construction algorithm. In an embodiment, the controller architecture 12 will receive or retrieve a propeller pitch angle for the aircraft and generate a glide path based thereon because the propeller pitch angle can affect the aircraft drag, which affects the aircraft glide path. If no propeller pitch angle data is available, the controller architecture 12 may use an approximation, such as a worst-case pitch angle that results in minimum glide distance.

In FIG. 6, a display graphic 600, showing a vertical flight profile, as may be displayed on the avionics display 32, is depicted. Initially, the ownship A/C is flying above a pre-programmed minimum altitude. In some embodiments, the pre-programmed minimum altitude 604 is about 10,000 feet above sea level. At 610 system 10 detects the EO condition, and at 612, the EO guidance mode is started. Flight path 606, to the ground at 602 is generated and rendered as the glide path for the pilot to follow. In various embodiments, in addition to generating a glide path, the controller architecture 12 may determine proper points along the flight plan to command a primary flight display (PFD), a lateral display, and/or a vertical situation display, to indicate (e.g., with a graphical object or icon placed in its relative position on the flight path) to the pilot the timing for each of: setting landing flaps; deploying landing gears; and, turning on landing lights. In various embodiments, the controller architecture 12 may render a graphical user interface object or icon that indicates that the FCS is in EO guidance mode.

In various embodiments, the controller architecture 12 may allow an Emergency Descent Mode (EDM) mode to take precedence over the EO Guidance Mode. For example, in another scenario, cabin pressure is detected as low at 614, and responsive thereto, the controller architecture gives precedence or priority to the EDM mode, thereby guiding the ownship A/C to ground along a steeper glidepath 608. In another embodiment, responsive to determining that an EO condition is indicated by the engine status, the controller architecture 12 may fly the aircraft on a steeper decline to an EDM altitude, at which it levels the aircraft, and from there it flies the aircraft along a glide path 618 to an alternate airport from what was picked before the EO condition was indicated.

In an embodiment, the controller architecture 12 picks the airport at which to land by prioritizing an altitude for the aircraft to arrive at. In a non-limiting example, a higher priority may be given to airports that can be arrived at 2500 ft AGL (above ground level) or more, a middle priority given to airports at 1500 ft AGL but less than 2500 ft AG, and a lowest priority to airports above 0ft AGL but less than 1500 ft AGL.

In another embodiment, the controller architecture 12 picks the airport at which to land by prioritizing minimal turning requirements. In a non-limiting example, a higher priority may be given an airport that can be arrived at with a fewest number of turns.

Figure 7:
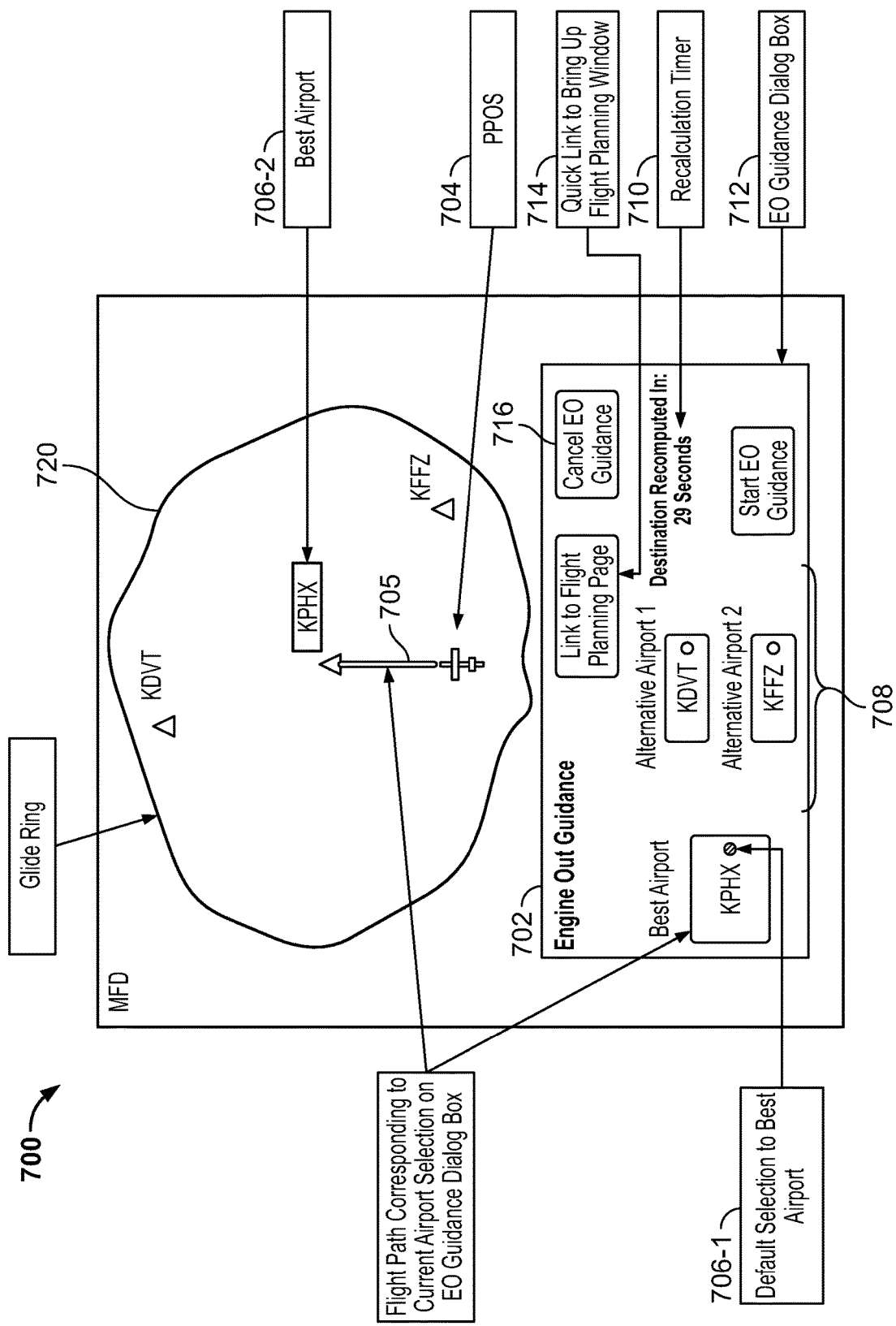
FIGS. 7-9 depict various informational presentations on an EO guidance dialog box overlaid on a lateral display on an avionics display device, in accordance with an exemplary embodiment of the present disclosure.

As mentioned, the controller architecture 12 provides visual guidance to the pilot during the EO guidance mode operation. Turning to FIGS. 6-7, At detection of an EO condition, the controller architecture 12 commands the MFD to automatically display the ⅔ INAV map on a window on available MFD. This could require MFD to perform automatic MFD swap. In various embodiments, the MFD will make entire ⅔ MFD display area available for the INAV map, which may automatically hide the vertical situation display (VSD) on the MFD. The controller architecture 12 commands the MFD to automatically adjust the INAV map range to display a generated glide ring range 720, the details of which are discussed in more detail below. Once a pilot starts (FIG. 7, 712) or cancels (FIG. 7, 716) the EO Guidance Mode, the controller architecture 12 releases the MFD to resume normal operations and allows pilot to control MFD.

As used herein, "EO destination selection phase" refers to a phase 611 between EO detection 610 and EO Guidance Mode activation 612 (or EO cancellation, as shown in FIG. 7, 716). In the in EO destination selection phase, the controller architecture 12 commands the MFD to automatically display airport information for each of the number of optimal EO airports necessary for a pilot to select one of them. In various embodiments, the lateral navigation information will be displayed on about ⅔ of an instrument navigation (INAV) map.

Figure 8:
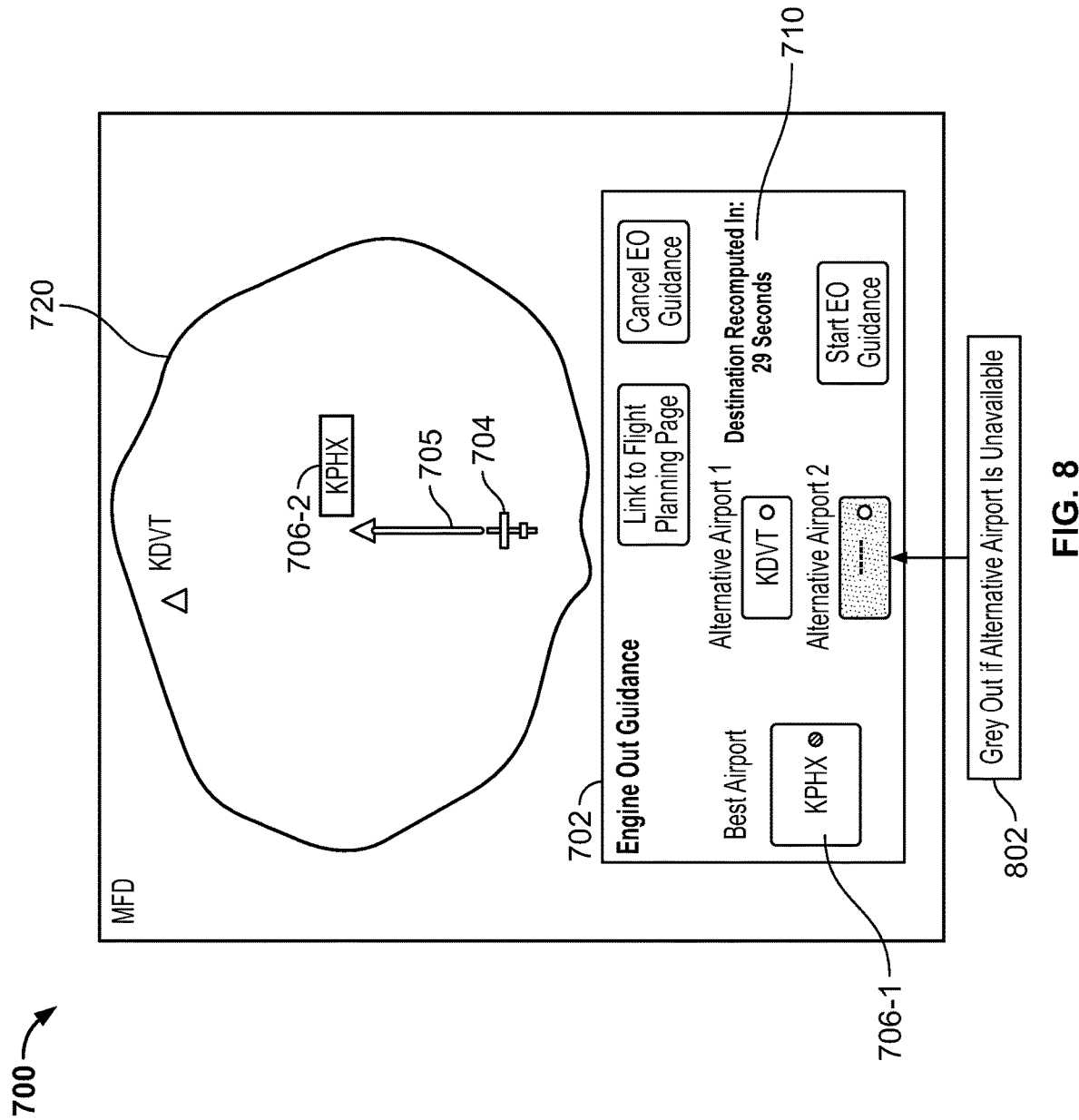
Figure 9:
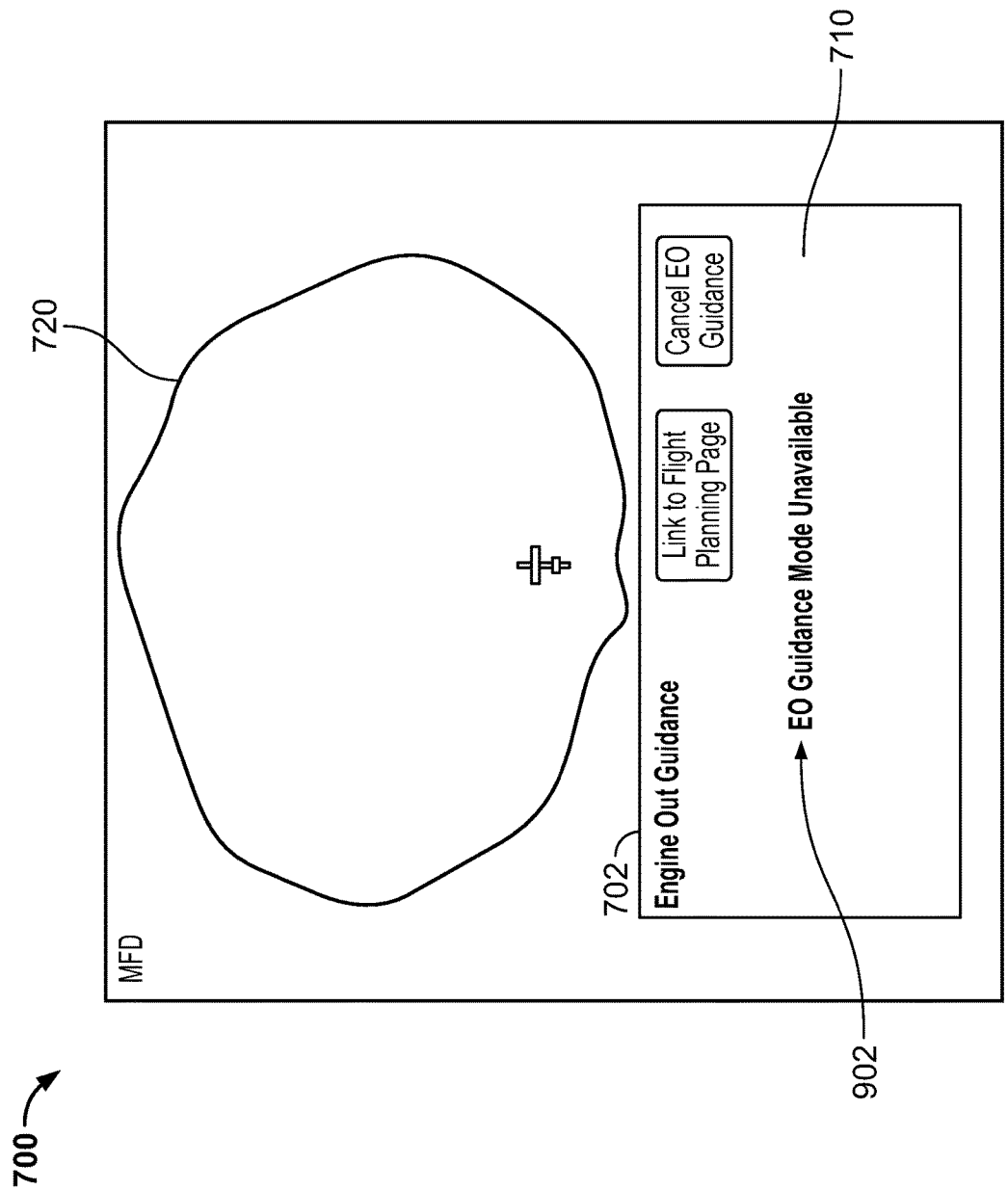

Turning now to FIGS. 7-9, various embodiments of EO airport selection guidance and visual range remaining graphics are provided. In FIG. 7, at detection of an EO condition, the controller architecture 12 commands the MFD 700 to automatically display an EO Guidance Dialog Box 702 on about a remaining ⅓ portion of the lateral INAV map to provide the pilot with guidance to select an EO destination airport. Regardless of the shape and size of the EO Guidance Dialog Box 702, the EO Guidance Dialog Box 702 does not cover up the display of the determined optimal EO destination airport. The controller architecture 12 commands the MFD 700 to display EO Guidance Dialog Box 702 such that all the optimal EO destination airports determined by the algorithm are visible to pilot, and that a selectable graphical user interface object (button 712) for a pilot to start the EO guidance is displayed.

On the INAV lateral display area, the ownship aircraft 704 is depicted with a flight path 705 to a current airport selection 706-2 on a lateral display that corresponds to a best airport default selection 706-1 (KPHX) on the EO guidance dialog box 702. Note that a central part of the EO guidance dialog box 702 is used for presenting, in alphanumeric form, alternative airports 708; in FIG. 7, alternative airport 1 is KDVT and alternative airport 2 is KFFZ. On the lateral display area of the MFD 700, triangles are used to indicate locations on the lateral map of: best airport default selection 706-2 (KPHX), alternative airport 1 is KDVT, and alternative airport 2 is KFFZ.

In various embodiments, the controller architecture 12 commands the MFD 700 to display the time (timer 710) until the next EO destination airport recalculation on EO Guidance Dialog Box 702. It is possible that the destination airports at the time of EO detection to be different by the time EO Guidance is activated in case pilot waits too long before activating the mode. Therefore, the controller architecture 12 coordinates between the FMS 40 and the MFD to ensure that guidance to the selected destination airport will be achievable at the time of EO Guidance activation. In the example, timer 710 shows a pilot how much time does he/she has left before optimal EO destination airports are recalculated. In this case, FMS 40 will take a pre-programmed maximum allowable activation time (e.g., 30 seconds) into consideration in the EO destination selection algorithm so that glide path to the destination will be achievable if activated within the allowable time. Upon expiration of the timer, FMS 40 will recalculate the optimal EO destination airports.

The controller architecture 12 commands the MFD 700 to automatically activate layers on INAV map critical for EO destination selection such as airport, WX, and terrain layers in EO destination selection phase. The controller architecture 12 commands the MFD 700 to automatically deactivate non-critical layers on INAV map in EO destination selection phase. The controller architecture 12 commands the MFD 700 to visually distinguish the 3 optimal EO destination airports on INAV map in EO destination selection phase. The optimal airports will be highlighted such that the most optimal airport appears most prominent.

In various embodiments, as shown in FIG. 8, the controller architecture 12 commands the MFD 700 to grey out 802 the corresponding alternative airport selection(s) section of the EO Guidance Dialog Box 702 if any of alternative airport is not available.

In various embodiments, as shown in FIG. 9, the controller architecture 12 commands the MFD 700 to display in the EO Guidance Dialog Box 702 an indication to the pilot that EO Guidance Mode is unavailable (FIG. 9, 902, text "EO Guidance Mode Unavailable") if any of the following conditions are satisfied: (1) EO Guidance Mode is not enabled, and (2) No valid EO Destination Airport is available from FMS 40. Further, the controller architecture 12 commands the MFD 700 to close the EO Guidance Dialog Box 702 if the pilot cancels the EO guidance mode (716). In various embodiments, the controller architecture 12 commands the MFD 700 to provide an interface for the pilot to manually select a destination airport, such as, with a link 714 to display a flight plan window on MFD.

In various embodiments, the controller architecture 12 will automatically display an engine restart an Electronic Check List (ECL) upon activation of the EO guidance mode. In various embodiments, the controller architecture 12 will automatically turn on a transponder (XPDR) and set it to the emergency code 7700 upon activation of the EO guidance mode. In various embodiments, the controller architecture 12 will automatically set the active flight plan to be the determined flight path to the EO default destination airport upon activation of the EO guidance mode.

The EO guidance mode operates with and without an automatic pilot (AP) functionality. In various embodiments, the controller architecture 12 will coordinate between the FMS 40 and FCS and will deactivate EO guidance mode if the pilot selects a different flight guidance mode. In various embodiments, the controller architecture 12 will require at least a 2-step pilot action to deactivate the EO guidance mode.

When in EO guidance mode, the controller architecture 12 will automatically request LNAV and vertical navigation (VNAV) engagement from the FCS and will automatically send an AP engagement request to AP servos upon activation of EO guidance mode. In various embodiments, the controller architecture 12 will employ an EO flight director mode upon EO guidance mode activation, and thereby provide guidance to follow the lateral and vertical path as well as a glide speed provided by the FMS 40. In various embodiments, as a tailorable option, a landing light will automatically turn on at a pre-programmed appropriate time during descent.

Figure 10:
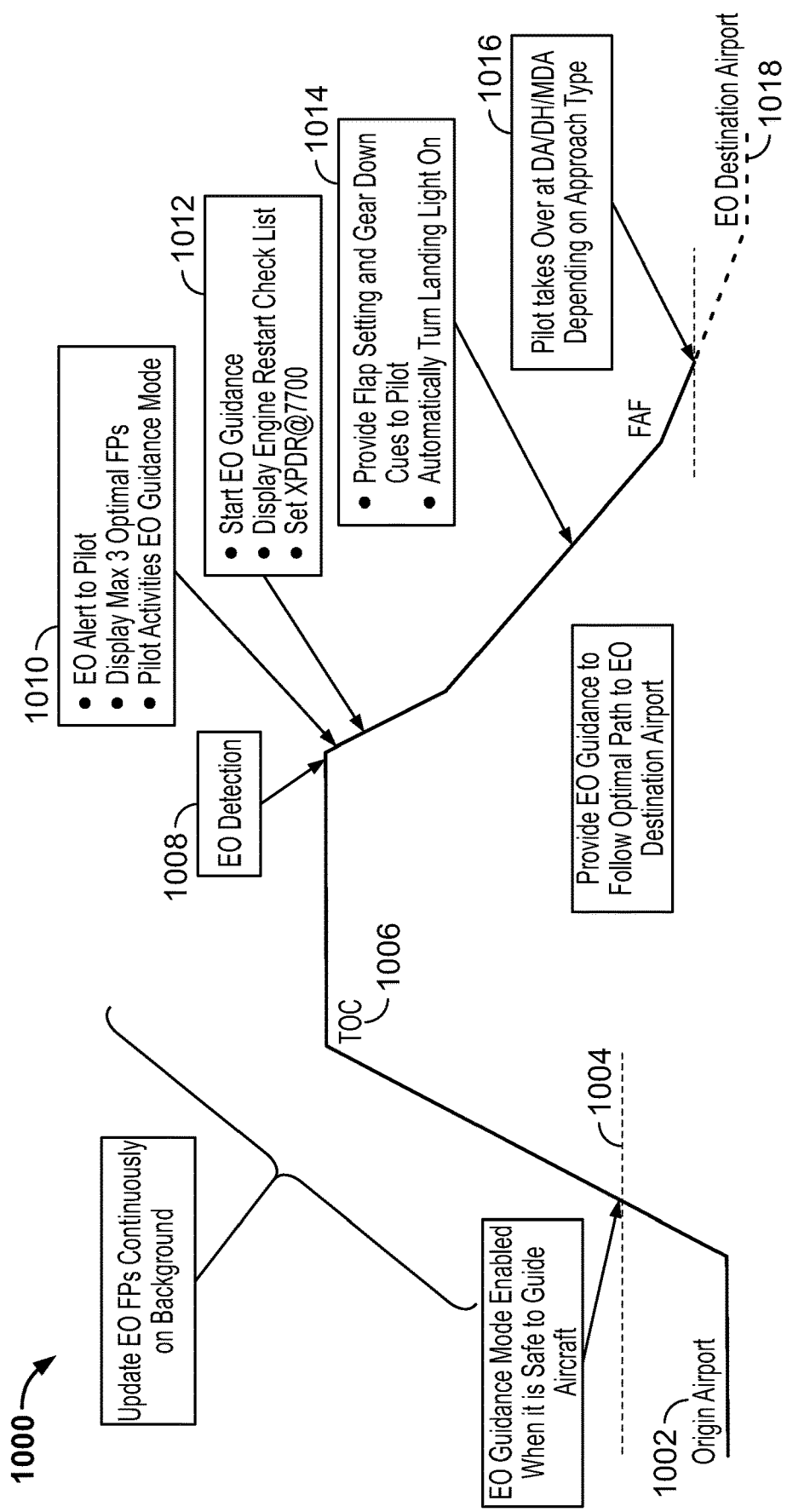
FIG. 10 depicts a vertical flight profile showing several operational use cases, in accordance with an exemplary embodiment of the present disclosure.

Turning now to FIG. 10, a vertical flight profile 1000 is depicted showing several operational use cases. The origin airport is at 1002, and after takeoff, at a pre-programmed altitude (1004) at which it is safe to guide the ownship A/C, EO guidance mode is enabled. At 1006 the A/C reaches its top of climb, at which time the altitude levels out and the A/C is in cruise mode. At 1008, an EO condition is detected. Between 1004 and 1008, the controller architecture 12 is continuously updating the various nearby airports and potential flight paths to them in a background mode. Responsive to the EO condition detection 1008, at 1010 the controller architecture 12 does the following: commands the audio system 36 to generate an aural alert, and commands the avionic display devices 14 to display the above-described EO Guidance Dialog Box 702 with up to 3 optimal airports for landing during the EO condition, and a user selectable object to start EO guidance mode. The flight profile begins to trend lower in altitude responsive to the EO condition. At 1010, the controller architecture 12 receives a pilot selection of the start EO guidance mode. Responsive to receiving a pilot selection of the start EO guidance mode, at 1012, the controller architecture 12 starts the EO guidance process steps and may (i) display an engine restart check list, and (ii) may set XPDR to 7700, as described above. At 1014, the controller architecture 12 provides flap settings and gear down cues to the pilot on the avionics displays 14, and automatically turns a landing light on. The A/C descends through the Final Approach Fix (FAF) and at 1016, the pilot takes over at a pre-programmed altitude, such as a decision height (DH), decision altitude (DA), or minimum decision altitude (MDA), depending on the approach type being implemented.

Examples of Methods for Range Visualization During EO Conditions

Figure 11:
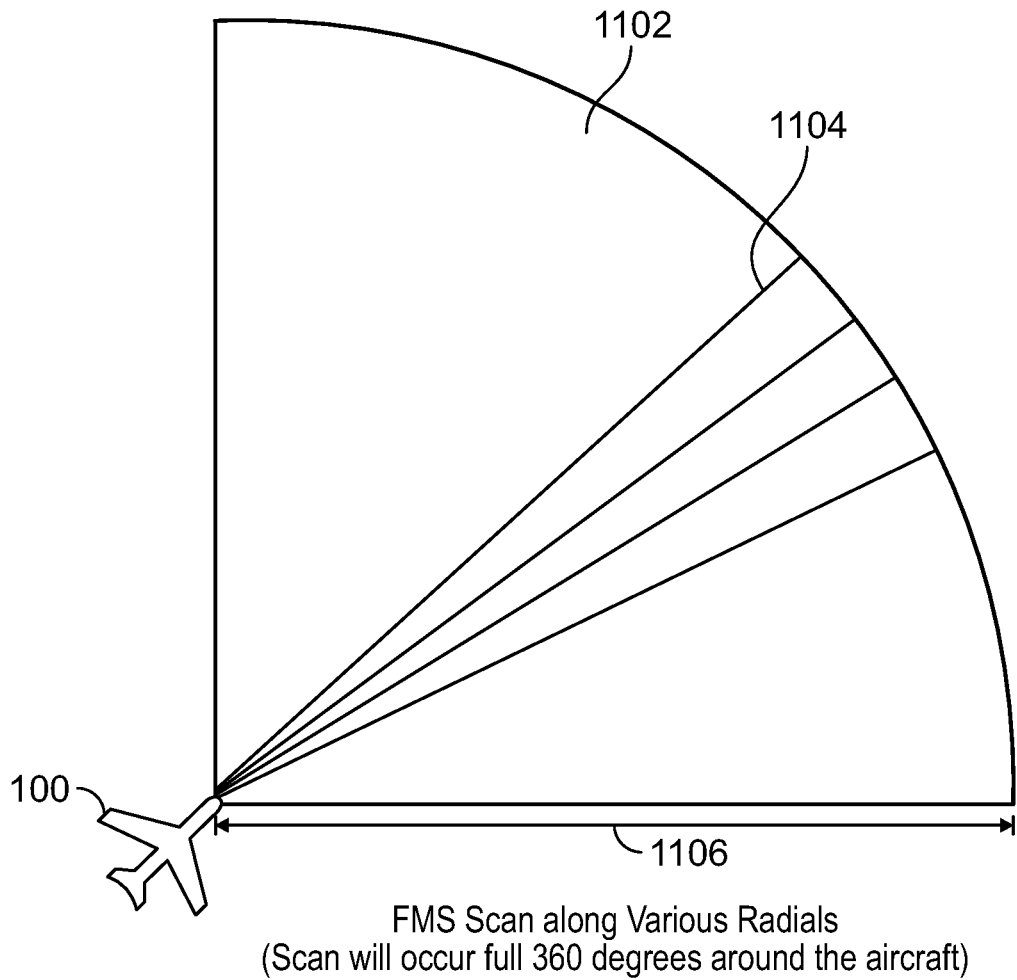
FIGS. 11-16 are diagrams that depict steps of a method for generating and displaying a range remaining glide ring, in accordance with an exemplary embodiment of the present disclosure.
Figure 12:
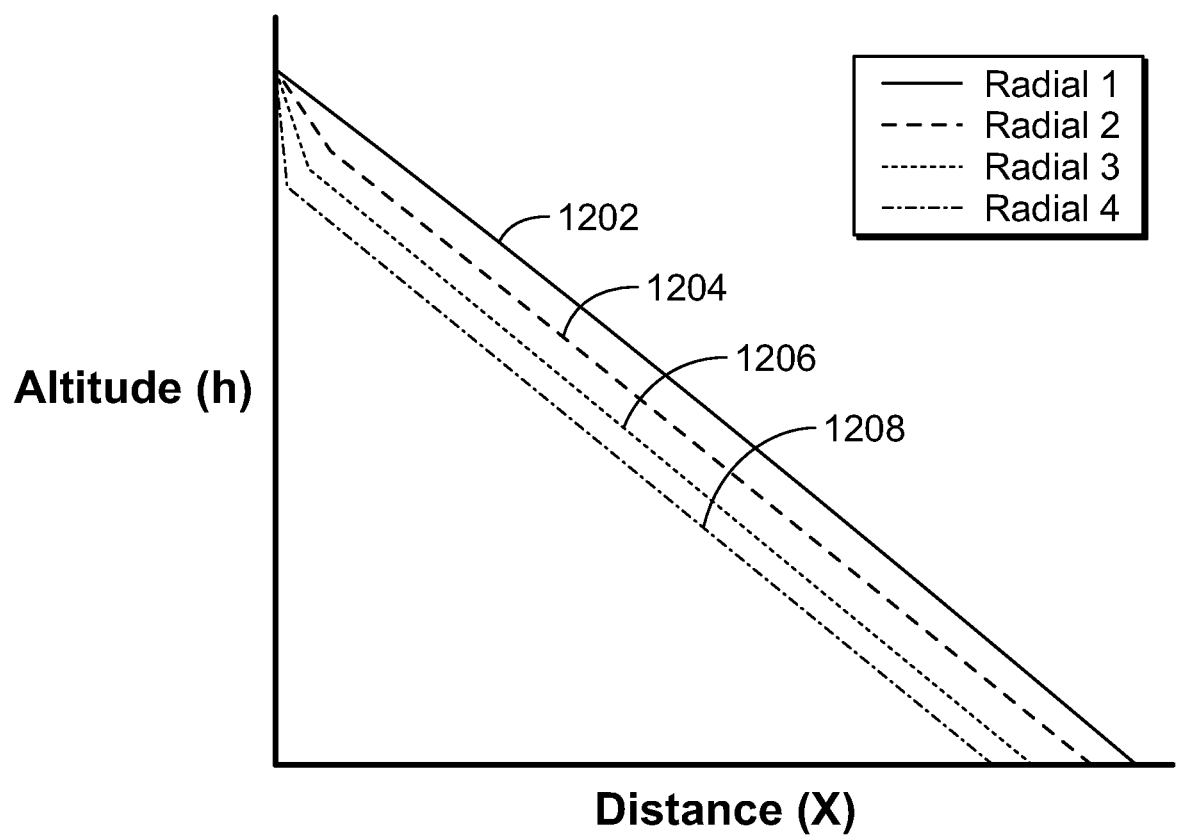

Turning now to FIGS. 11-12, a FMS 40 may create altitude profiles (also called glide profiles) for each of a plurality of radials 1102 (at whatever resolution is necessary, 1 deg, 0.5 deg, etc.); the glide profile along each radial 1104 may represent altitude as a function of distance, as shown in FIG. 12 (radials 1202, 1204, 1206, and 1208. Although depicted, for simplifying purposes, as extending through a planar 90-degree scan in FIG. 11, in practice, the radials may scan a full 360 degrees around the aircraft 100. The controller architecture 12 will take into consideration avionics specific input from the OEM for the given ownship aircraft 100 with respect to performance in wind and loss of potential energy due to lateral maneuvering (turns). Initially, each initial radial has the same length, i.e., all radials are initially of equal range 1106. As the aircraft 100 maneuvers laterally, or encounters headwinds, the glide profile will change and the initial range, which is the intersection with sea level altitude, will decrease in distance. This computation will result in a matrix of incremental glide profiles as a function of altitude along a distance for each radial of a plurality of radials.

Figure 13:
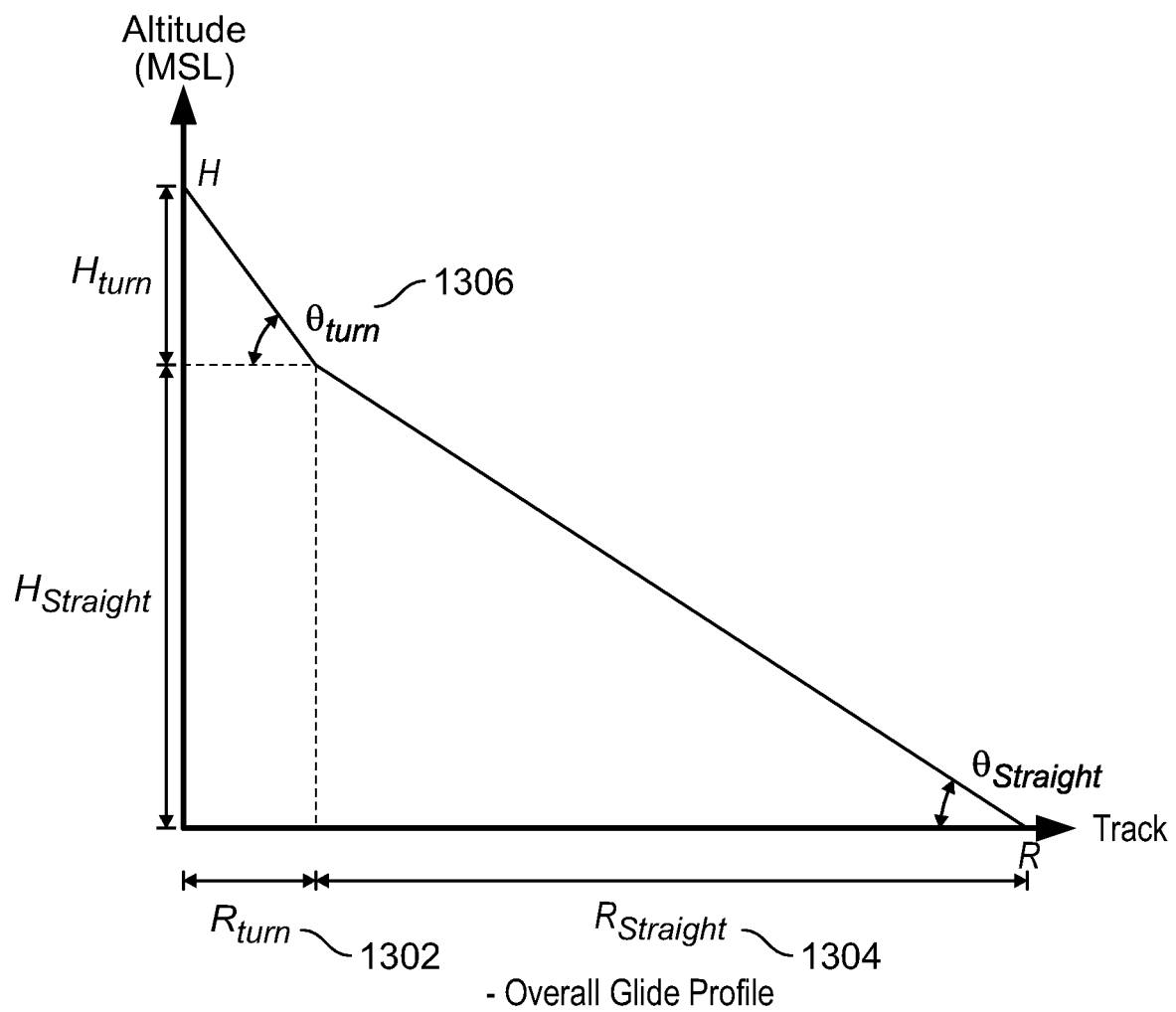

Turning to FIG. 13, the controller architecture 12 may employ the FMS 40 to compute a maximum glide profile range for each radial as a sum of the following ranges:

Glide range during turn, $R_{turn}$, 1302

Glide range at constant heading, $R_{straight}$, 1304

Figure 14:
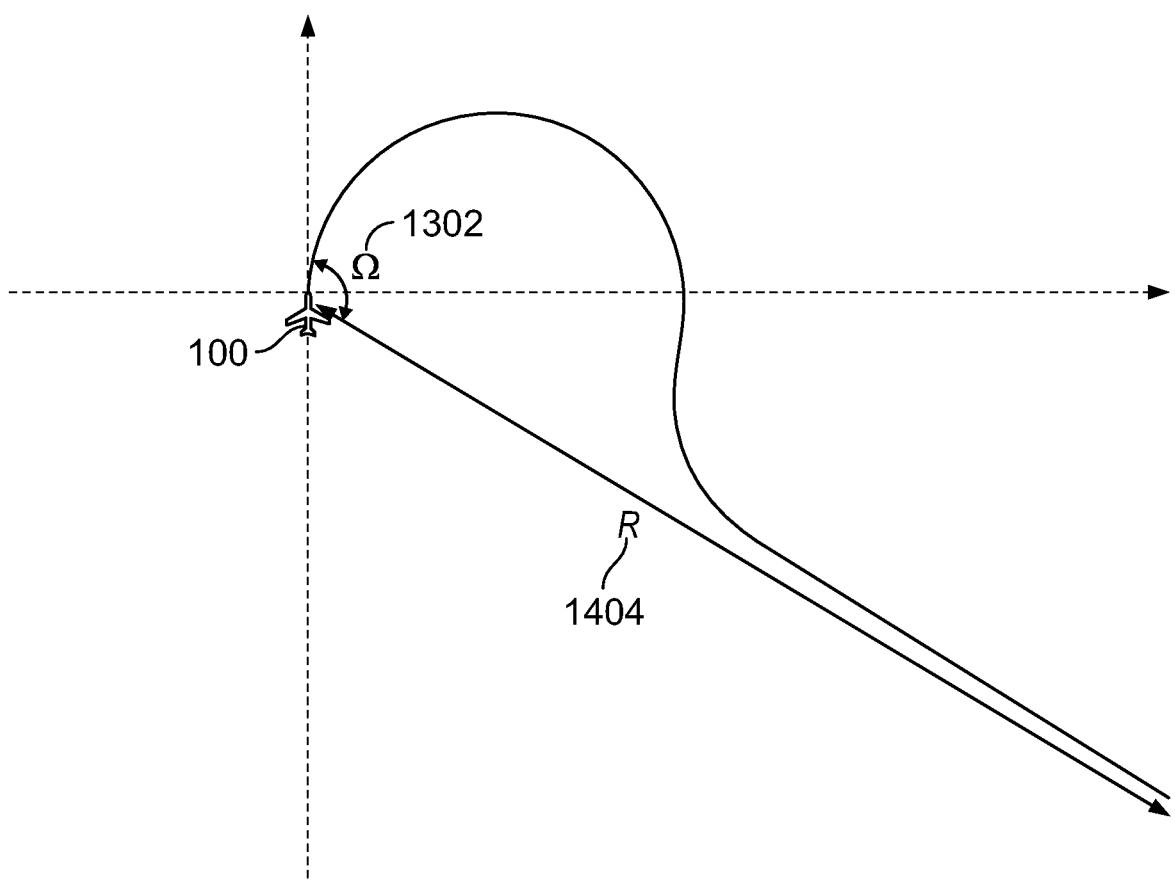

The controller architecture 12 may employ the FMS 40 to determine the maximum glide profile based on the current aircraft altitude and the aircraft's glide performance, lift to drag ratio $(L/D)_{max}$ for a given aircraft configuration. During a turn, the effect of bank angle ($\varphi$) turn, 1306 on the glide profile will be considered since a turn at a higher bank angle will result in a steeper glide slope. In FIG. 14, each unique glide radial ($\Omega$) with an initial aircraft speed (V) will be used to determine the turn radius, which will be used to determine the duration of time it takes for the aircraft to complete the turn into establishing the heading along glide profile. The combination of $R_{turn}$ 1302 plus $R_{straight}$ 1304 provides the maximum glide profile range R 1404 along a given radial.

Turning now to FIG. 14, the controller architecture 12 may employ the FMS 40 to compute a range for a given turn, $R_{turn}$ 1302, based on the following parameters: Current altitude, H; Bank angle, $\varphi$; Glide radial, $\Omega$ 1402; Initial aircraft speed, V; the glide performance, $$\left(\frac{L}{D}\right)_{max}$$

for a given aircraft configuration (e.g., flap setting, landing gear, and propeller pitch angle); and, a Current wind vector. The controller architecture 12 may employ the FMS 40 to compute a range for a constant heading, $R_{straight}$ 1304, based on the following parameters: Current altitude, $H-H_{turn}$; The glide performance, $$\left(\frac{L}{D}\right)_{max}$$

for a given aircraft configuration (e.g., flap setting, landing gear, and propeller pitch angle); and, a Current wind vector.

Figure 15:
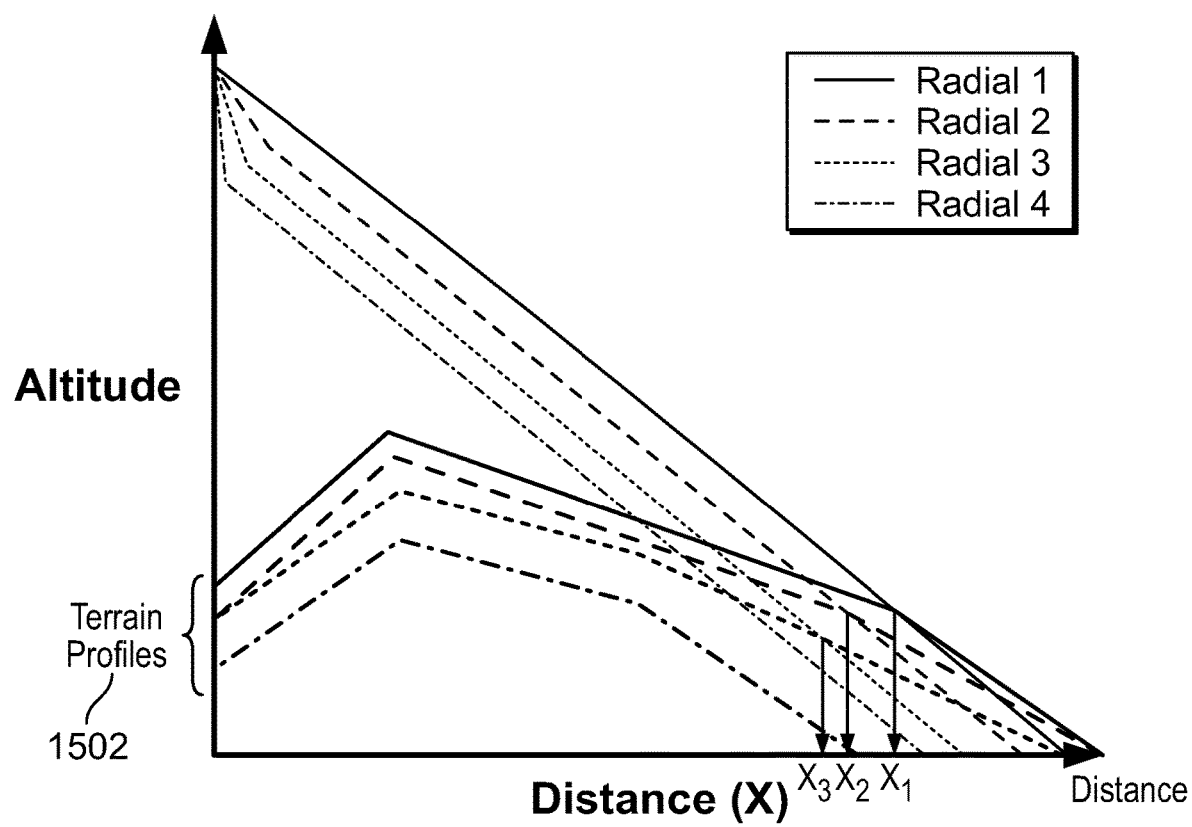
Figure 16:
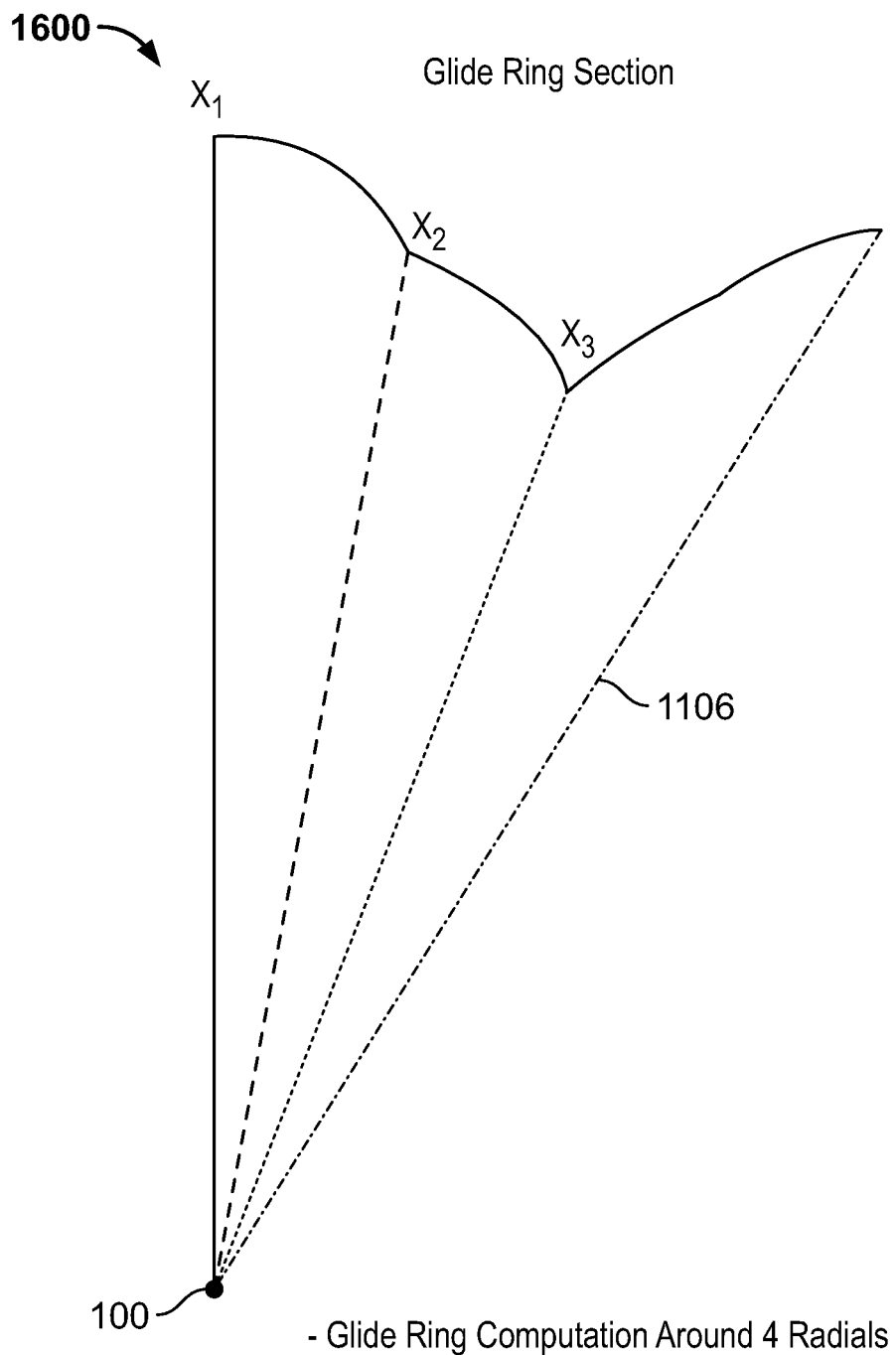

In FIG. 15, known terrain profiles 1502, retrieved from any of a variety of sources, such as a terrain database, are overlaid on the glide profile matrices generated as described in connection with FIG. 12, above. At places where a terrain profile intersects with a radial, the radial is truncated in its range measurement. In the example of FIGS. 15-16, there are three intersections of the radials with terrain: at X1, at X2, and at X3; and a right-most radial has the initial radius 1106. In an embodiment, the algorithm in program 42 also identifies, in the generation of the glide profiles, the terrain between the aircraft and the destination and what obstacles are near the glide profile. FIG. 16 depicts this in a top-down, or lateral view of a portion of a modified glide range ring 1600. In this manner, the provided flight guidance system can generate and render a technologically improved glide range ring visualization. The boundary of the glide range ring, as rendered by the system 10, intuitively conveys to the pilot the different glide range remaining distances around the ownship.

Referring back to FIGS. 7-9, a closer look at the glide range ring 720 reveals an irregular shape that embodies the above described glide range ring generation and display.

Although an exemplary embodiment of the present disclosure has been described above in the context of a fully-functioning computer system (e.g., flight guidance system 10 described above in conjunction with FIGS. 1-3), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution. In certain implementations, the flight guidance system may include GUI components, such as ARINC 661 components, which may include a User Application Definition File ("UADF"). As will be appreciated by one skilled in the art, such a UADF is loaded into the light guidance system and defines the "look and feel" of the display, the menu structure hierarchy, and various other static components of the GUI with which a pilot or other user interacts.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

The invention claimed is:

1. A flight guidance system for airport selection during engine out (EO) conditions in an aircraft, the system comprising:

a source of an engine status;

a source of aircraft status data for the aircraft; and a controller architecture operationally coupled to the source of the engine status and the source of aircraft status data, and configured to:

determine, continuously, a current location and trajectory of the aircraft by processing the aircraft status data;

responsive to determining that an EO condition is indicated by the engine status, generating a notification of the EO condition;

determine when an enable is valid for EO guidance;

receive an activate EO guidance command; and begin an EO guidance mode responsive to receiving the activate EO guidance command when the enable is valid; and while in the EO guidance mode, perform EO guidance operations including:

computing an optimal EO destination airport and corresponding path to said optimal EO destination from the current location;

presenting the optimal EO destination airport and the corresponding path for a pilot to review;

receiving a pilot selection of the optimal EO destination airport subsequent to presenting the optimal EO destination airport;

constructing a lateral and a vertical glide path to the optimal EO destination airport; and creating a plurality of glide profiles for each of a plurality of radials extending from the current location, each glide profile having a range that indicates an aircraft specific performance in wind and loss of potential energy due to lateral maneuvers.

2. The flight guidance system of claim 1, wherein the controller architecture is further configured to determine that the enable is valid for EO guidance as a function of when an altitude of the aircraft is at or above a minimum height above ground.

3. The flight guidance system of claim 2, wherein the controller architecture is further configured to receive the activate EO guidance command from a pilot via an input interface.

4. The flight guidance system of claim 3, wherein the controller architecture is further configured to receive a deactivate input and turn off the EO guidance mode responsive to the received deactivate input.

5. The flight guidance system of claim 3, wherein the controller architecture is further configured to generate the notification as an aural alert, a visual alert, or an aural alert and a visual alert.

6. The flight guidance system of claim 3, wherein the controller architecture is further configured to generate the notification as an alphanumeric Engine Out message included into a visual alert incorporated into a Crew Alerting System (CAS) message.

7. The flight guidance system of claim 1, wherein the controller architecture is further configured to present the optimal EO destination airport and the corresponding path on an avionic display in the aircraft.

8. The flight guidance system of claim 7, wherein the controller architecture is further configured to determine proper points along the corresponding path to command an avionic display to indicate with a graphical object or icon placed in its relative position on the corresponding path, a timing for each of: setting landing flaps; deploying landing gears; and, turning on landing lights.

9. The flight guidance system of claim 1, the controller architecture is further configured to determine the optimal EO destination airport is one of a number of optimal EO airports that are within a distance threshold from the aircraft.

10. The flight guidance system of claim 9, the controller architecture is further configured to set the distance threshold equal to a glide ring.

11. The flight guidance system of claim 10, the controller architecture is further configured to receive an assigned priority for each of the optimal EO airports in the number of optimal airports.

12. A method for flight guidance for airport selection during engine out (EO) conditions in an aircraft, the method comprising:
at a controller architecture programmed by programming instructions,
processing received aircraft status data to determine, continuously, a current location and trajectory of the aircraft;
processing received engine status to determine whether an EO condition is indicated;
responsive to determining that an EO condition is indicated,
generating a notification of the EO condition;
determining when an enable is valid for EO guidance;
receiving an activate EO guidance command; and
beginning an EO guidance mode responsive to receiving the activate EO guidance command when the enable is valid; and
while in the EO guidance mode, performing EO guidance operations including:
computing an optimal EO destination airport and corresponding path to said optimal EO destination from the current location;
presenting the optimal EO destination airport and the corresponding path for a pilot to review;
receiving a pilot selection of the optimal EO destination airport subsequent to presenting the optimal EO destination airport;
constructing a lateral and a vertical glide path to the optimal EO destination airport;
tuning a multi-mode digital radio (MMDR) to an appropriate frequency if the pilot selection includes an Instrument Landing System (ILS) approach; and
creating a plurality of glide profiles for each of a plurality of radials extending from the current location, each glide profile having a range that indicates an aircraft specific performance in wind and loss of potential energy due to lateral maneuvers.

13. The method of flight guidance of claim 12, further comprising generating the notification as an aural alert, a visual alert, or an aural alert and a visual alert.

14. The method of flight guidance of claim 12, further comprising generating the notification as an alphanumeric Engine Out message included into a visual alert incorporated into a Crew Alerting System (CAS) message.

15. The method of flight guidance of claim 13, further comprising presenting the optimal EO destination airport and the corresponding path on an avionic display in the aircraft.

16. The method of flight guidance of claim 15, further comprising determining points along the corresponding path to command the avionic display to indicate with a graphical object or icon placed in its relative position on the corresponding path, a timing for each of: setting landing flaps; deploying landing gears; and, turning on landing lights.

17. The method of flight guidance of claim 16, further comprising determining the optimal EO destination airport is one of a number of optimal EO airports that are within a distance threshold from the aircraft.

18. The method of flight guidance of claim 17, further comprising setting the distance threshold equal to a glide ring.

19. The method of flight guidance of claim 18, further comprising receiving an assigned priority for each of the optimal EO airports in the number of optimal airports.

20. The method of flight guidance of claim 19, further comprising receiving a deactivate input and turn off the EO guidance mode responsive to the received deactivate input.

* * * * *